US012770176B2

(12) United States Patent
Raghavan

(10) Patent No.: US 12,770,176 B2
(45) Date of Patent: Oct. 20, 2026

(54) SYSTEM AND METHOD FOR IDENTIFYING COMPLEMENTARY OBJECTS FROM IMAGES

(71) Applicant: Shopify Inc., Ottawa (CA)

(72) Inventor: Kshetrajna Raghavan, Fremont, CA (US)

(73) Assignee: Shopify Inc., Ottawa (CA)

( * ) Notice: Subject to any disclaimer, the term of this patent is extended or adjusted under 35 U.S.C. 154(b) by 426 days.

(21) Appl. No.: 18/337,286

(22) Filed: Jun. 19, 2023

(65) Prior Publication Data

US 2024/0354830 A1 Oct. 24, 2024

Related U.S. Application Data

(60) Provisional application No. 63/497,233, filed on Apr. 20, 2023.

(51) Int. Cl.

| | |
|---|---|
| ***G06Q 30/0601*** | (2023.01) |
| ***G06V 10/74*** | (2022.01) |
| ***G06V 10/762*** | (2022.01) |

(52) U.S. Cl.

CPC ..... *G06Q 30/0631* (2013.01); *G06Q 30/0643* (2013.01); *G06V 10/761* (2022.01); *G06V 10/762* (2022.01)

(58) Field of Classification Search

CPC ............ G06Q 30/0631; G06Q 30/643; G06V 10/762; G06V 10/761

See application file for complete search history.

(56) References Cited

U.S. PATENT DOCUMENTS

| | | | | |
|---|---|---|---|---|
| 12,579,564 | B1 * | 3/2026 | Yang | G06Q 30/0631 |
| 2018/0107902 | A1 * | 4/2018 | Yang | G06N 3/084 |
| 2023/0394549 | A1 * | 12/2023 | Li | G06F 16/90328 |
| 2024/0232980 | A1 * | 7/2024 | Wen | G06Q 30/0631 |
| 2024/0242260 | A1 * | 7/2024 | Shanker | G06Q 30/0631 |

* cited by examiner

*Primary Examiner* — Ming Shui

(74) *Attorney, Agent, or Firm* — CPST Intellectual Property Inc.; Brett J. Slaney

(57) ABSTRACT

A system and method are provided for identifying complementary objects from images and, in particular, to using images containing objects determined based on an input, to identify such complementary objects. The method includes determining one or more objects based on an input, using an input embedding associated with the input, and object embeddings associated with the one or more objects; determining a plurality of images containing the one or more objects; identifying complementary objects in the images; and providing an output collection of identified complementary objects.

24 Claims, 16 Drawing Sheets

SYSTEM AND METHOD FOR IDENTIFYING COMPLEMENTARY OBJECTS FROM IMAGES

CROSS-REFERENCE TO RELATED APPLICATION(S)

This application claims priority to U.S. Provisional Patent Application No. 63/497,233 filed on Apr. 20, 2023, the contents of which are incorporated herein by reference in their entirety.

TECHNICAL FIELD

The following relates generally to identifying complementary objects from images and, in particular, to using images containing objects determined based on an input, to identify such complementary objects.

BACKGROUND

Product recommendations may be used by merchants to notify users of related products or similar products that have been sold with selected products by other users. These product recommendations may be used to drive additional sales, e.g., when a user is interacting with an e-commerce platform.

BRIEF DESCRIPTION OF THE DRAWINGS

Embodiments will now be described with reference to the appended drawings wherein.

DETAILED DESCRIPTION

Figure 1A:
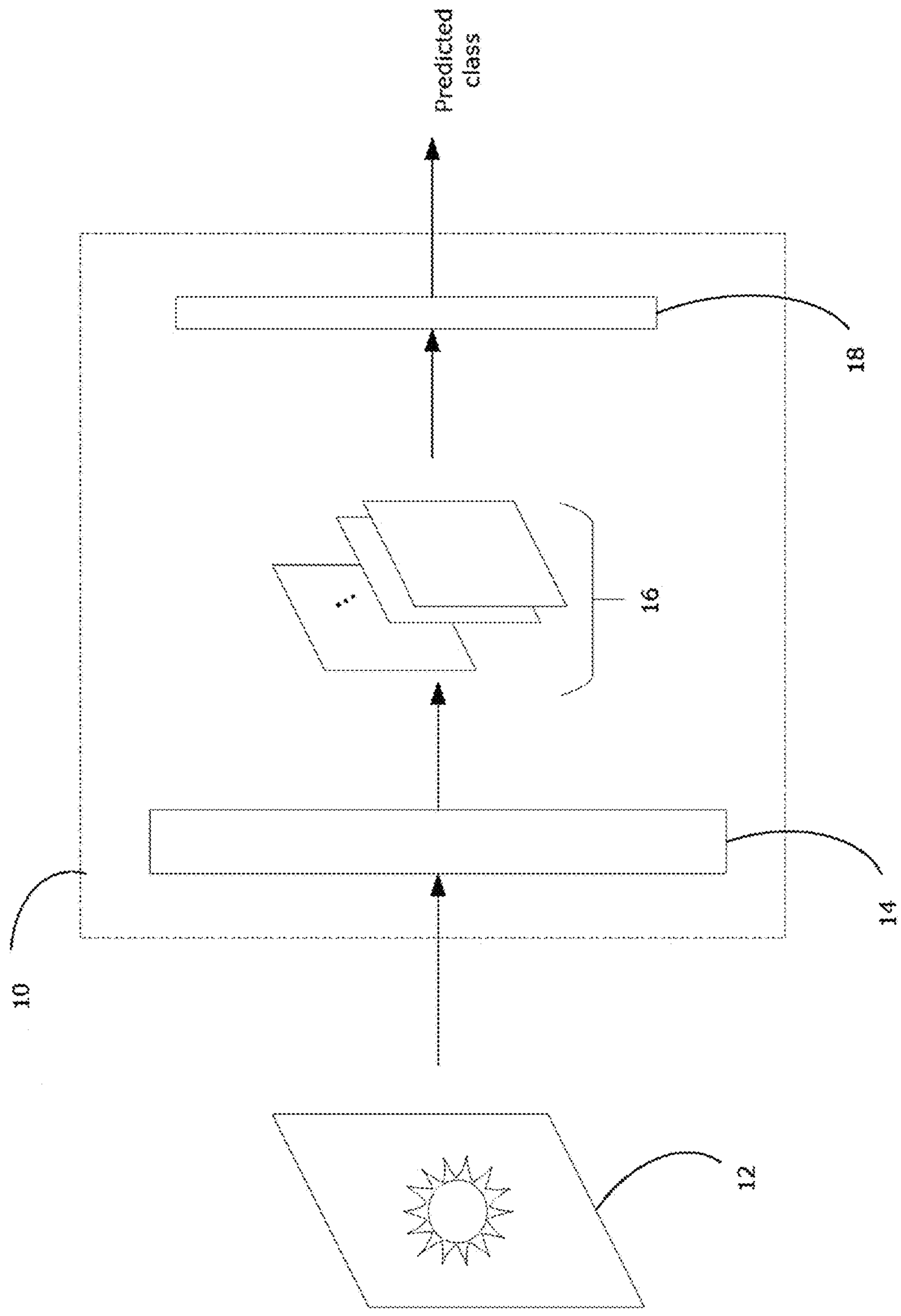
FIG. 1A is a block diagram of a simplified convolutional neural network, which may be used in examples of the present disclosure.

Current methods used to provide product recommendations may rely on techniques such as collaborative filtering, which recommends items by matching the current user to a group of similar users for whom there is data on products purchased or otherwise engaged with. Other techniques may involve presenting a buyer with items that are commonly purchased together or items that are related. These solutions may be adequate for finding 'similar' or 'related' products, but for a buyer looking to make purchases of products that complement each other, these techniques may be inadequate for, or even incapable of, providing useful and personalized results. For example, for a user looking to purchase a complete outfit such as a blazer, dress shirt, belt, dress pants and shoes, these techniques may find similar or related products for one piece of the outfit, but not necessarily the other complementary products.

Additionally, the aforementioned solutions may be biased towards products for which there is a large dataset of buyer engagement signals, e.g., products that have been part of a catalog for a long time and have been browsed many times. As a result, discoverability may be low for products that have recently been introduced to the catalog.

To determine and provide collections of complementary products to those determined from an input, the proposed solution uses products that are determined to be similar to the input-related product as a proxy, such that images of the similar products are used to find such complementary products and may result in a collection of complementary products based on the images. Matching the input to the similar products may use embeddings of the input and of the object(s) in an appropriate embedding space. The collection of complementary products may then be clustered, and the clusters used in various user experience flows, such as to pre-emptively provide product recommendations or to refine subsequent search results related to the input product, e.g., by linking and refining subsequent search queries when the size of the matching cluster satisfies a size threshold.

While certain examples provided herein relate to products and product queries, the principles equally apply to any object. The methods described herein may therefore be applied to not only e-commerce applications but also to various services (e.g., travel, media), design (e.g., technical, fashion, architectural) and other user experiences that involve determining objects that are complementary to one another.

In general, the method determines at least one object from an input, e.g., a search query, an object selection, or other user input that identifies the at least one object. A similarity engine or equivalent tool may be used to find objects that are similar to the input object. For example, matching the input to object(s) may use embeddings of the input and of the at least one object in an appropriate embedding space. The object(s) determined from the input can be located from an available source, such as in a local database (e.g., catalogue) or an external source. For each of the at least one object, there exists one or more associated images and this may include a set or collection of images. For example, a similar object may have a set of photos stored in a catalogue entry, which can be used as a proxy to find related objects. That is, each object related to the input may itself be associated with more than one image having other products, e.g., complementary products.

The related objects may be identified by analyzing the contents of the image(s) using embeddings of the input and of the object(s). This can be done in various ways based on the tools and associated data that is available. For example, in a simple case, the image may already be tagged with metadata associated with various objects shown in the image and this metadata may be used to infer that an object is complementary to the input object. In other examples, a large language model (LLM) may be used to look for certain complementary objects based on a candidate list of complementary objects. The candidate list may be taken from a taxonomy of objects that may be related, a rule set, a question set, or some other guide or instruction as to how to query the LLM to determine a refined set of complementary objects that are in the image. The LLM may take the form of an artificial intelligence chatbot that the user or the system may interact with. In other examples, image processing can be applied directly to the image to perform object detection using machine learning models trained on how to identify such objects from images. For example, bounding boxes may be used to identify objects for further analysis, e.g., by referencing a taxonomy of potentially related objects.

In this way, the associated images of the similar products may be used as a proxy to determine, from a candidate list of potential complementary objects, those that are able to be identified in the associated images, to generate and output a collection of complementary objects.

The collection of complementary objects may then be used for subsequent steps in a user experience workflow, such as in providing recommendations or refining a search for an object that is associated with the collection of complementary objects. The collection of complementary objects, particularly when they become large, may be clustered based on an object type or object characteristic. Using the above example, a search for a white shirt may then generate clusters of complementary pants, belts, blazers, and shoes. The clusters may be used to provide the subsequent recommendations and/or to refine search results for items that may have a cluster identified. Moreover, for large clusters, such clusters may be divided into new, more refined, clusters or sub-clusters. For example, a large cluster of complementary belts may be sub-clustered into black belts and brown belts.

In one aspect, there is provided a computer-implemented method, comprising: determining one or more objects based on an input, using an input embedding associated with the input, and object embeddings associated with the one or more objects; determining a plurality of images containing the one or more objects; identifying complementary objects in the images; and providing an output collection of identified complementary objects.

In certain example embodiments, the one or more objects are determined based on a similarity to an object associated with the input.

In certain example embodiments, the method may further include clustering the output collection of identified complementary objects into object clusters based on similarities between the objects.

In certain example embodiments, the method may further include using the object clusters to provide at least one recommended object associated with the input.

In certain example embodiments, the object clusters may be used if satisfying a size threshold.

In certain example embodiments, the at least one recommended object may be provided in response to an input related to another object that is associated with at least one of the object clusters.

In certain example embodiments, the another object may be identified from a search query associated with the another object.

In certain example embodiments, the method may further include providing the at least one recommended object if a distance metric is satisfied.

In certain example embodiments, the distance metric may include a time since identifying the input or a distance between the input and the another object in a taxonomy of objects.

In certain example embodiments, the method may further include displaying a query comprising a characteristic of one of the object clusters; and displaying a reordered result list of objects based on a response to the query.

In certain example embodiments, identifying the complementary objects in the images may include instructing a large language model (LLM) to analyze the images for presence of at least one of the complementary objects.

In certain example embodiments, the LLM may include an artificial intelligence chatbot.

In certain example embodiments, identifying the complementary objects in the images may include applying an image processing technique to the images to detect objects in the images and identify detected objects using a machine learning model trained to detect objects in images.

In certain example embodiments, identifying the complementary objects in the images may include using metadata accompanying a corresponding one of the images, the metadata comprising at least one similarity to one of the complementary objects.

In certain example embodiments, at least one of the objects may include a plurality of associated images used to identify the complementary objects.

In certain example embodiments, an object associated with the input may be determined from a search query related to the object associated with the input.

In certain example embodiments, the input may be determined from a selection of an object associated with the input.

In certain example embodiments, the object associated with the input may be selected from a search query related to the object.

In certain example embodiments, the input and the output collection of identified complementary objects may correspond to products viewable via an e-commerce platform.

In certain example embodiments, associated images comprising the complementary objects may be accessed from a database available to the e-commerce platform.

In certain example embodiments, a candidate list of complementary objects may be used to identify the complementary objects in the images.

In certain example embodiments, the candidate list of complementary objects may be selected from one of a plurality of candidate lists based on an object type.

In another aspect, there is provided a system comprising a processor; an output device coupled to the processor; at least one input device coupled to the processor; and at least one memory. The at least one memory includes processor executable instructions that, when executed by the at least one processor, causes the system to: determine one or more objects based on an input, using an input embedding associated with the input, and object embeddings associated with the one or more objects; determine a plurality of images containing the one or more objects; identify complementary objects in the images; and provide an output collection of identified complementary objects.

In another aspect, there is provided a computer-readable medium comprising processor executable instructions that, when executed by a processor, cause the processor to: determine one or more objects based on an input, using an input embedding associated with the input, and object embeddings associated with the one or more objects; determine a plurality of images containing the one or more objects; identify complementary objects in the images; and provide an output collection of identified complementary objects.

Neural Networks and Machine Learning

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
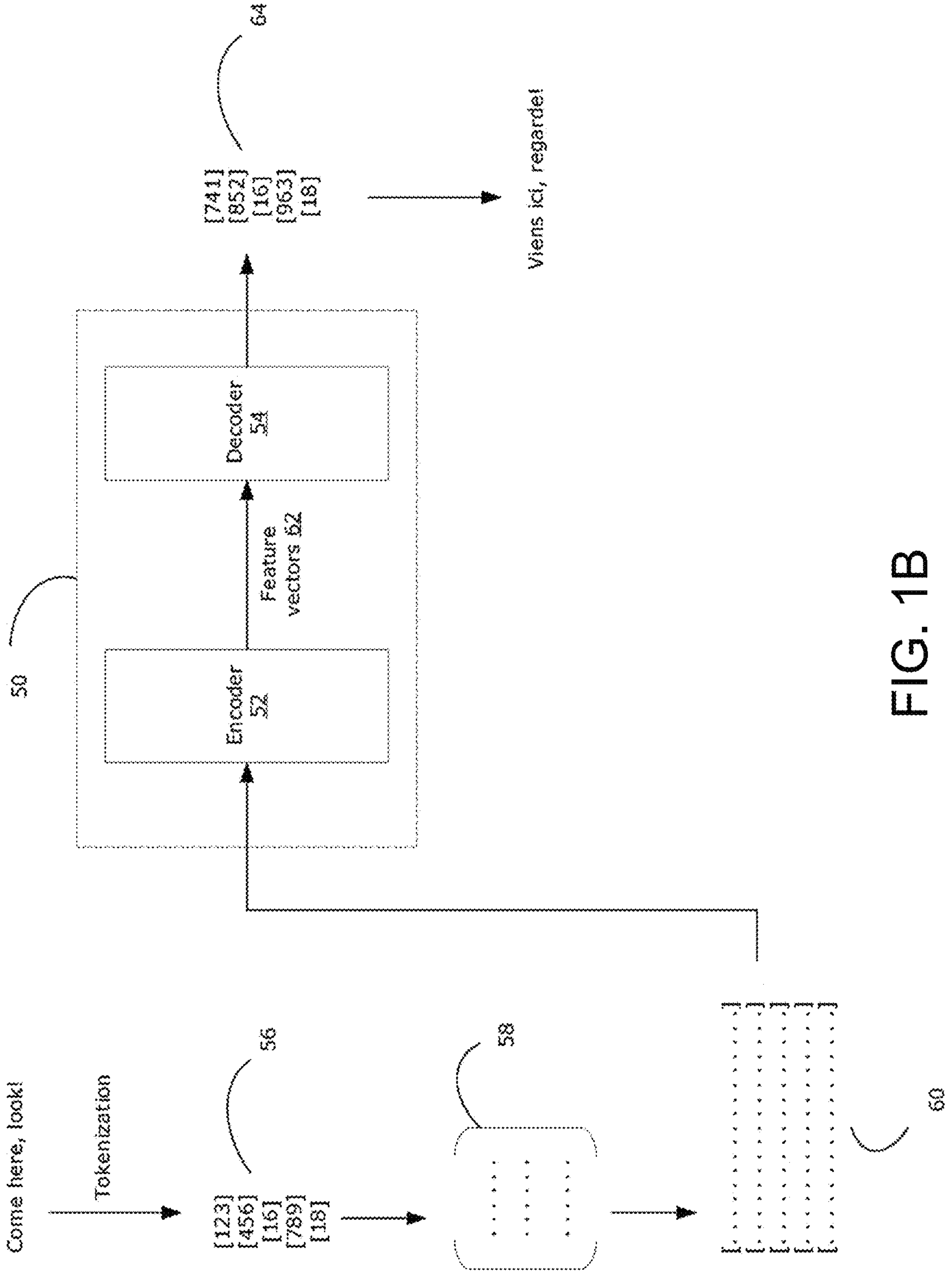
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
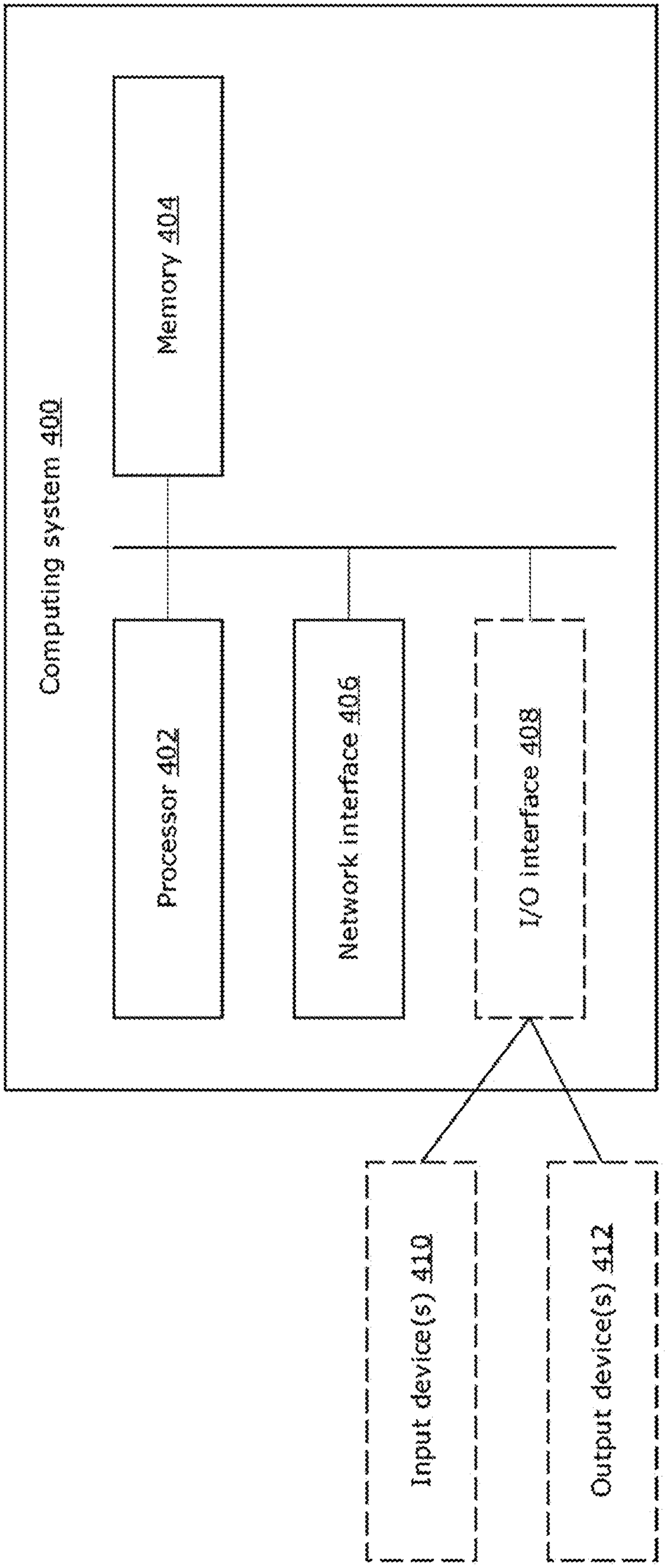
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or “creativity” of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a “best of” parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Using Images Containing Objects Determined Based on Inputs to Identify Complementary Objects To determine and provide collections of complementary products to those determined from an input, the proposed solution uses products that are determined to be similar to the input-related product as a proxy, such that images of the similar products are used to find such complementary products and may result in a collection of complementary products based on the images. Matching the input to the similar products may use embeddings of the input and of the object(s) in an appropriate embedding space. The collection of complementary products may then be clustered, and the clusters used in various user experience flows, such as to pre-emptively provide product recommendations or to refine subsequent search results related to the input product, e.g., by linking and refining subsequent search queries when the size of the matching cluster satisfies a size threshold.

Figure 3A:
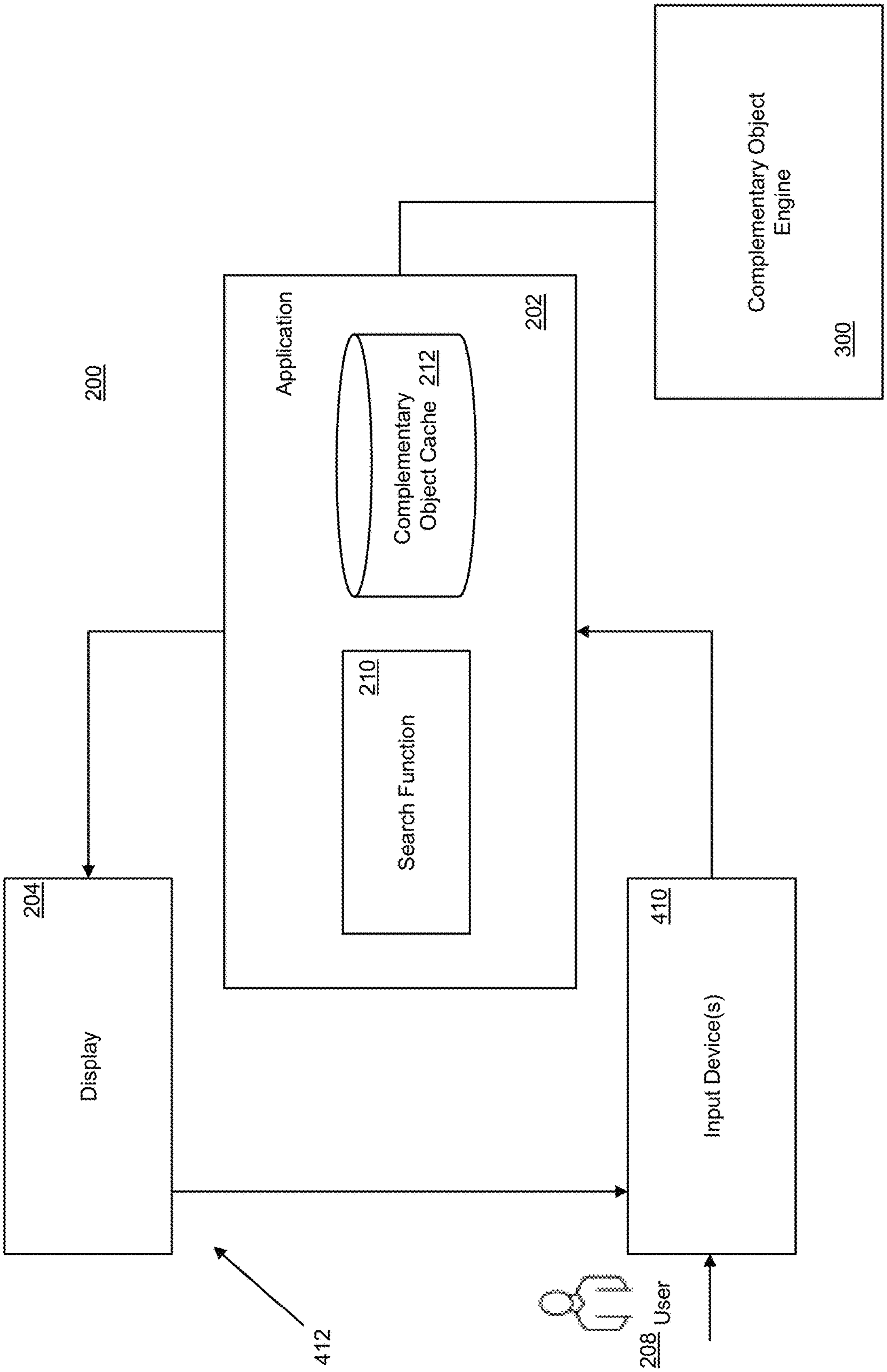
FIG. 3*a* is an example of a computing environment in which a complementary object engine is provided with or accessible to an application.

FIG. 3*a* illustrates an example of a computing environment 200 in which an application 202 is provided by or with one or more computing devices 240 (see FIG. 4) or computing systems 400 (see FIG. 2 described above). Such computing systems 400 or computing devices 240 can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc. The application 202 includes a search function 210 to enable a user 208 to interact with the application 202 to search for a desired object such as a product. The application 202 can take the form of a desktop-type application, a mobile-type application (also referred to as an "app"), an embedded application in customized computing systems, or an instance or page contained and provided within a web/Internet browser 250 (e.g., see FIG. 4), to name a few. The search function 210, while shown as part of the application 202, can instead be provided by a separate computing device 240 or computing system 400 used to run the application 202. As such, the configuration shown in FIG. 3*a* is illustrative and other computing device/system configurations are possible as shown by way of example in FIGS. 2, 3*b* and 4.

For example, the computing environment 200 shown in FIG. 3*a* can represent a single device such as a portable electronic device or the integration/cooperation of multiple electronic devices such as a client device and server device or a client device and a remote or offsite storage or processing entity or service. That is, the computing environment 200 can be implemented using any one or more electronic devices including standalone devices and those connected to offsite storage and processing operations (e.g., via cloud-based computing storage and processing facilities). For example, the search function 210 may be provided by an electronic device while a complementary object cache 212 used by such a search function 210 can, at least in part, be stored and accessed from an external memory or application, including a cloud-based service or application 202.

The application 202 and search function 210 are coupled to a display 204 to render and present/display user interface (UI) elements, UI components, and UI controls utilized by a UI rendered by application 202 (e.g., via or including the search function 210), on the display 204. While examples referred to herein may refer to a single display 204 for ease of illustration, the principles discussed herein can also be applied to multiple displays 204, e.g., to view portions of UIs rendered by or with the application 202 on separate side-by-side screens. That is, any reference to a display 204 can include any one or more displays 204 or screens providing similar visual functions. The application 202 receives one or more inputs from one or more input devices 410, which can include or incorporate inputs made via the display 204 as illustrated in FIG. 3*a* as well as any other available input to the computing environment 200 (e.g., via the I/O interface 408 shown in FIG. 2), such as haptic or touch gestures, voice commands, eye tracking, biometrics, keyboard or button presses, etc. Such inputs may be applied by a user 208 interacting with the computing environment 200, e.g., by operating an electronic device having the display 204 and at least an interface to one or more input devices 410.

Figure 4:
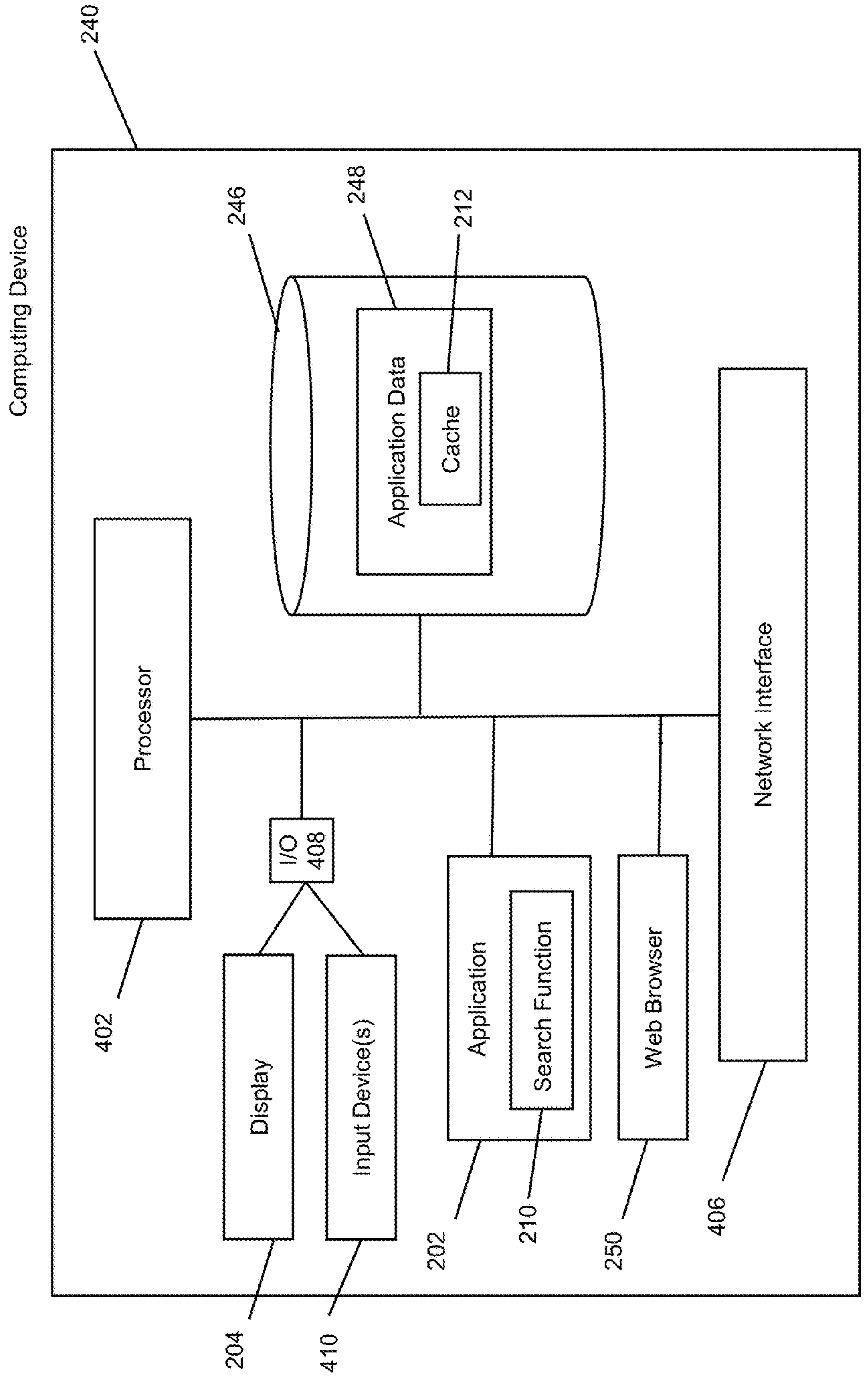
FIG. 4 is an example of a computing device having an application and search function configured to utilize a complementary object engine.

The application 202 or a computing device 240 within the computing environment 200 can include or have access to application data 248 (see FIG. 4). The application data 248 can include data used by the application 202 to perform operations provided by the features associated with the application 202, including data used in rendering UIs such as a UI that includes the search function 210. The application data 248 may include a complementary object cache 212, which provides a storage allocation for collections of complementary objects determined as discussed below, and for other data associated with such objects that may be used by the application 202, e.g., using the search function 210, in providing complementary object collections to the user 208 via an output such as a displayed recommendation or modification to a UI element such as a search result list.

Figure 3B:
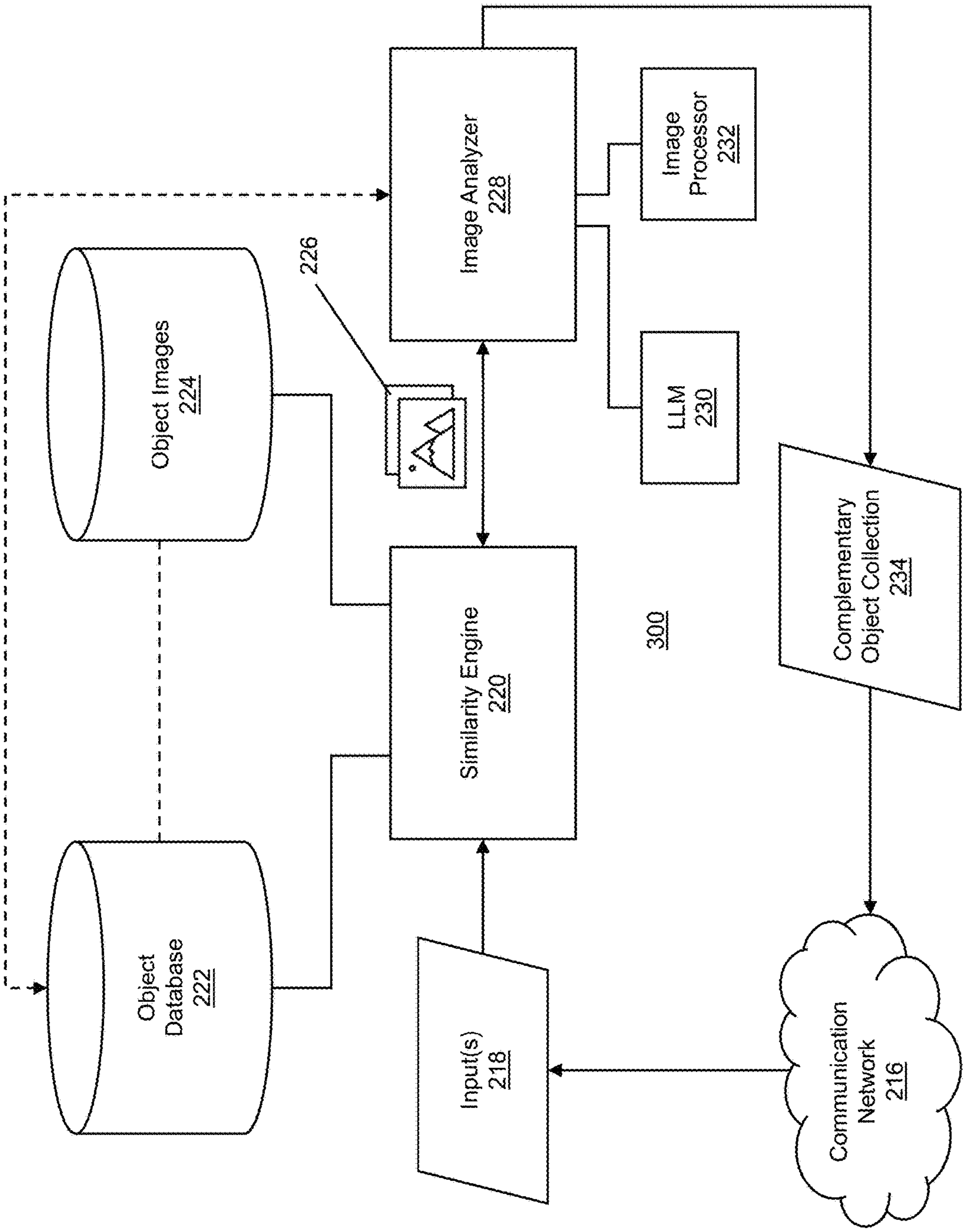
FIG. 3*b* is an example of a configuration for the complementary object engine shown in FIG. 3*a*.

The application 202 may include, or as shown in the example configuration, have access to, a complementary object engine 300. The complementary object engine 300 may be used to process an input associated with an object (e.g., a search query for that object) to determine one or more complementary objects to that object using images that contain similar objects as a proxy. FIG. 3*b* illustrates an example of a configuration for implementing a workflow executed by the complementary object engine 300.

The complementary object engine 300 in this example is coupled to a communication network 216, e.g., to communicate with a computing device 240 or computing system 400 in the computing environment 200. Such communication network(s) 216 may include a telephone network, cellular, and/or data communication network to connect different types of client- and/or server-type devices. For example, the communication network 216 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The complementary object engine 300 may receive one or more inputs 218 via the communication network 216 and generate and provide an output such as a complementary object collection 234, e.g., to/from the application 202. The one or more inputs 218 are provided to a similarity engine 220. The similarity engine 220 determines an object associated with the one or more inputs 218, e.g., a product identified in a search query entered using the search function 210. The similarity engine 220 may use the identified object that is associated with the one or more inputs 218 to determine a set of one or more related objects from an object database 222. For example, if the object is a product that is the subject of a search query, the similarity engine 220 may use text from the search and/or an embedding for/with data associated with the input(s) 218 to determine related objects, such as other products that possess similar features or characteristics. The embedding may include feature representations for product identifiers, images associated with the product, or any other available embedding used with the data associated with the input(s) 218. For example, a user may perform a text-based search for a "shirt", which in itself provides little insight. However, the user may then select a particular shirt from a list of search results, with the particular shirt being white in color and which includes buttons, a collar, and has long sleeves. These features may be determinable from a product description or image embeddings that is/are associated with the selected shirt.

That is, the input 218 may include one or more embeddings that may be used by the similarity engine 220 to find similar white shirts in the object database 222 (e.g., in a product catalogue). For example, the similarity engine 220 may use the embeddings related to color and at least one feature such as buttons to find similar products. By identifying the related object(s), the similarity engine 220 may locate one or more images 226 of the similar objects, e.g., from an object images database 224 that is associated with the object database 222. For example, a product catalogue of items may have an associated database of object images 224 that is used to provide product details in a product page UI. The object database 222 may therefore also include products that have embeddings that may be used by the similarity engine 220 to match, associate, correlate or otherwise find similarity with the embeddings associated with the input 218. Once matched by the similarity engine 220, the relate object images database 224 may be accessed to obtain a set of one or more images 226 for each similar object (e.g., for each similar white shirt in this example).

The images 226 may then be used as a proxy to find complementary objects to the object associated with the input(s) 218. In the configuration shown in FIG. 3*b*, the images 226 may be fed to an image analyzer 228 to generate the complementary object collection 234. It can be appreciated that multiple sets of images 226 may be processed to find complementary objects from multiple different similar objects. Such multiprocessing may be done in parallel or sequentially. The complementary object collection 234 may be determined by analyzing the images 226 of the similar objects to determine other objects displayed in the images 226 with the similar object(s) to infer complementarity. The image analyzer 228 may use available embeddings and a processing technique to identify such complementary objects.

For example, a LLM 230 may be used by the image analyzer 228 to determine from the contents of the images 226 whether any complementary products are present. The LLM 230 may be queried by the image analyzer 228 to determine from the embeddings for the images 226 whether certain other objects are present. This may include using a product taxonomy to structure a set of queries to be fed to the LLM 230 based on the product identified by the similarity engine 220. In other words, a candidate list of complementary objects may be used to identify a more specific list of complementary objects determined from the image(s) 226.

In the above example, since the similarity engine 220 identifies one or more similar white shirts, the image analyzer 228 may use a clothing taxonomy to query the LLM 230 for related products such as pants, belts, shoes, etc. This may include a general query such as "identify other clothing in the image" or more specific queries such as "does the image include a pair of pants". Other lines of inquiry may also be generated to target the complementary objects. For instance, the image analyzer 228 may use the LLM 230 to determine if the image(s) 226 contain a human. If so, the LLM 230 may be used to determine what else the human is wearing. If the image 226 does not contain a human, the LLM 230 may be queried to determine if anything else is shown in the image 226. In this way, the LLM 230 may be leveraged to locate other relevant items in the image 226 as well as to exclude irrelevant objects. For example, the LLM 230 may be queried to determine what objects are shown in the scene containing the object associated with the input 218. Background objects may be used to exclude objects that may be relevant to the scene but not necessarily complementary to the object associated with the input 218. In the above example, the LLM 230 may be used to search image embeddings to determine that several objects in the scene are part of a background shelf while a human standing in front of the shelf is wearing and/or holding certain items that may be more relevant.

The image analyzer 228 may, additionally or alternatively, use an image processor 232 to identify complementary objects in the images 226. For example, the image processor 232 may use an object recognition process to detect objects in the images 226 and use bounding boxes to target those objects for further analysis. The targeted objects may have embeddings associated with them, e.g., via image embeddings, tags or other metadata. The image processor 232 may also use a machine learning process to identify the objects using a model that is trained to identify objects in images. Such a machine learning model may be a generic model or may be specific to a type or genre of object/product. For example, if the similarity engine 220 is analyzing a set of images 226 for similar white shirts, the image processor 232 may use a clothing related model to identify other clothing pieces or accessories in the images 226 that may then be inferred to be complementary on the basis that they are shown with the white shirt in the images 226.

The image analyzer 228 may also use any available structured or unstructured data in or with the images 226 using any suitable processing technique. For example, the images 226 obtained from the object images database 224 may have already been tagged with products, features, and characteristics for some other purpose and can be leveraged with minimal processing to identify the complementary object collection 234.

The objects identified by the image analyzer 228 may be linked to the object database 222 and therefore themselves have related object images 224 which may be accessed directly, or may be used to find similar objects, e.g., using the similarity engine 220 as shown in FIG. 3*b*. That is, the objects identified by the image analyzer 228 may be associated with a specific object such as a product that is known (or can be found), or may be used to conduct a search for complementary objects that possess similar characteristics or features. For example, the image analyzer 228 may determine that the white shirts are being worn with blue shoes but the blue shoes are not specifically identified as a product. The image analyzer 228 may then use the similarity engine 220 to find blue shoes that are similar to those found in the image(s) 226, thus using the images 226 as a proxy to find the complementary shoes that may be recommended to the user 208.

The complementary object collection 234 may include one or more complementary objects and the collection 234 may be clustered when the collection 234 becomes large. For example, a set of similar objects may each produce multiple images 226, each of which includes multiple potential complementary objects. When a number of similar objects are analyzed, the collection 234 may grow relatively large and require at least some filtering, classification, or organization, e.g., via clustering. Clustering allows the complementary object collection 234 to categorize the complementary objects. The size of each cluster may be used as a metric to determine the objects relative complementarity or as a threshold to determine whether or not to recommend that object. The complementary object collection 234 may therefore be of varying size and complexity with clustering or other organizational techniques such as classification or categorization applied to provide the complementary object cache 212 with manageable data for use in a subsequent operation such as in organizing subsequent search results, providing product recommendations, etc.

While the complementary object engine 300 is shown as being a separate tool accessed by the application 202 over communication network 216 this is only one possible configuration. That is, the complementary object engine 300 may, additionally or alternatively, be integral to the application 202 or may reside on the same computing device 240 or computing system 400 as the application 202 in other example configurations. Moreover, the communication network 216 shown in FIG. 3*b* may, additionally or alternatively, be internal to the computing environment 200. In the configuration shown in FIG. 3*b*, a cloud-based or otherwise external service may be provided to the application 202 and other applications (not shown) in a centralized and distributed manner. In this way, other types of applications 202 or services may leverage the complementary object engine 300. The search function 210 is only one example of an input mechanism that may be used to obtain the input(s) 218. For example, the input(s) 218 may be determined from browsing data or other input signals generated by or for the user 208 when interacting with the computing environment 200 for any purpose for which knowledge of a complementary object may be desirable. As indicated above, the principles discussed herein may be used in various settings such as for services (e.g., travel, media), design (e.g., technical, fashion, architectural) and other user experiences that involve determining objects that are complementary to one another.

FIG. 4 shows an example of a computing device 240 implementing an example embodiment of the computing environment 200 shown in FIG. 3*a* in which an application 202 and search function 210 may be used. In this example, the computing device 300 includes one or more processors 402 (e.g., a microprocessor, microcontroller, embedded processor, digital signal processor (DSP), central processing unit (CPU), media processor, graphics processing unit (GPU) or other hardware-based processing units) and one or more network interfaces 406 (e.g., a wired or wireless transceiver device connectable to a network via a communication connection), as illustrated in FIG. 2. Examples of such communication connections can include wired connections such as twisted pair, coaxial, Ethernet, fiber optic, etc. and/or wireless connections such as LAN, WAN, PAN and/or via short-range communications protocols such as Bluetooth, WiFi, NFC, IR, etc. The computing device 240 also includes a data store 246, the application 202 (which in this example includes a search function 210) and/or a web browser 250. The data store 306 may represent a database or library or other computer-readable medium configured to store data and permit retrieval of such data. The data store 246 may be read-only or may permit modifications to the data. The data store 246 may also store both read-only and write accessible data in the same memory allocation. In this example, the data store 246 stores application data 248 for the application 202, which may include the complementary object cache 212. The complementary object cache 212 may enable the application 202 to temporarily store complementary object collections 234 for use during a session or for any suitable period of time requested by the application 202.

While not delineated in FIG. 4, the computing device 240 includes at least one memory 404 (see also FIG. 2) or memory device that can include a tangible and non-transitory computer-readable medium having stored therein computer programs, sets of instructions, code, or data to be executed by processor(s) 402. The processor(s) 402 and network interface(s) 406 are connected to each other via a data bus or other communication backbone to enable components of the computing device 240 to operate together as described herein. FIG. 4 illustrates examples of modules and applications stored in memory 404 on the computing device 240 and operated by the processor(s) 402. It can be appreciated that any of the modules and applications shown in FIG. 4 may be hosted externally and be available to the computing device 240, e.g., via a network interface 406. The data store 246 in this example stores, among other things, the application data 248 that can be accessed and utilized by the application 202. The computing device 240 also includes the display 204 and one or more input device(s) 410 (see also FIG. 2) that may be utilized as described above. The web browser 250 is shown by way of example to illustrate that the application 202, or an application that is similarly configured, may be accessed by a user of the computing device 240 via a network 216 accessible via the network interface 406. That is, an application 202 and search function 210 may also be accessed and utilized by the computing device 240 from a server or other remote source and need not be a locally running application 202.

Figure 5:
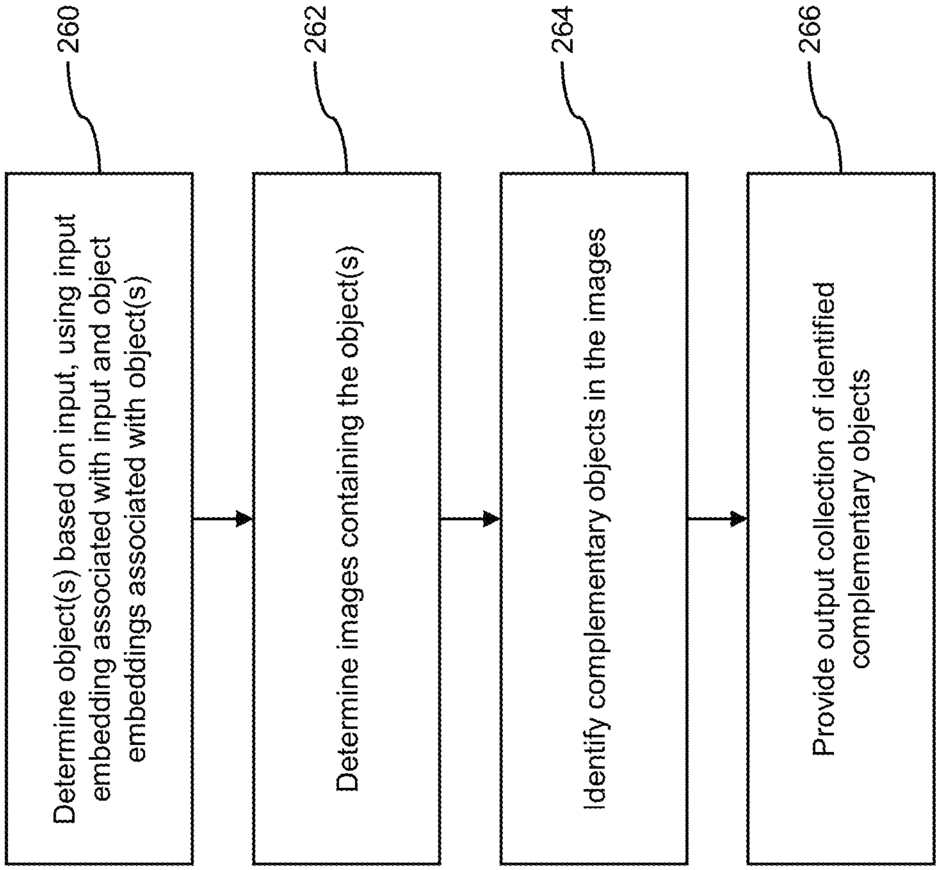
FIG. 5 is a flow chart illustrating example operations for identifying complementary objects from images.

Referring now to FIG. 5, a flow chart is provided illustrating example operations for identifying complementary objects from images 226. The operations shown in FIG. 5 may be implemented by an electronic device (e.g., computing device 240 shown in FIG. 4 or computing system 400 shown in FIG. 2), a server, or other computing device 240 in the computing environment 200. At block 260, the complementary object engine 300 may use the similarity engine 220 to determine one or more objects, for which complementary objects are to be determined, based on one or more inputs 218 as discussed above. The object(s) may be determined using input embeddings associated with the input(s) 218 (e.g., text from a search, image embeddings in a selected image of a product, etc.) and object embeddings associated with the object(s) (e.g., product details, tags, image embeddings or other embeddings for objects in the object database 222).

At block 262, the similarity engine 220 may determine images containing the objects, for example, the object images 224 that are associated with the object database 222. It can be appreciated that the object images 224 may be obtained from any available and suitable source, including internal or external sources, which may be private or public databases and/or other online content (e.g., product webpages).

At block 264, the image analyzer 228 may be used to identify complementary objects in the images 226 that were determined in block 262. For example, as discussed above, the image analyzer 228 may use a LLM 230 or image processor 232 or any available data processing tool that is capable of analyzing the contents or related data for the images 226, to identify such complementary objects. Depending on the number of similar objects that are analyzed and the number of images 226 that are processed, the complementary objects that are identified may be organized, grouped or clustered as provided by way of example below. Whether one or many complementary objects are identified, at block 266, a collection 234 of the identified complementary objects may be output, e.g., by returning the complementary object collection 234 to the application 202 as illustrated in FIGS. 3*a* and 3*b*.

Figure 6A:
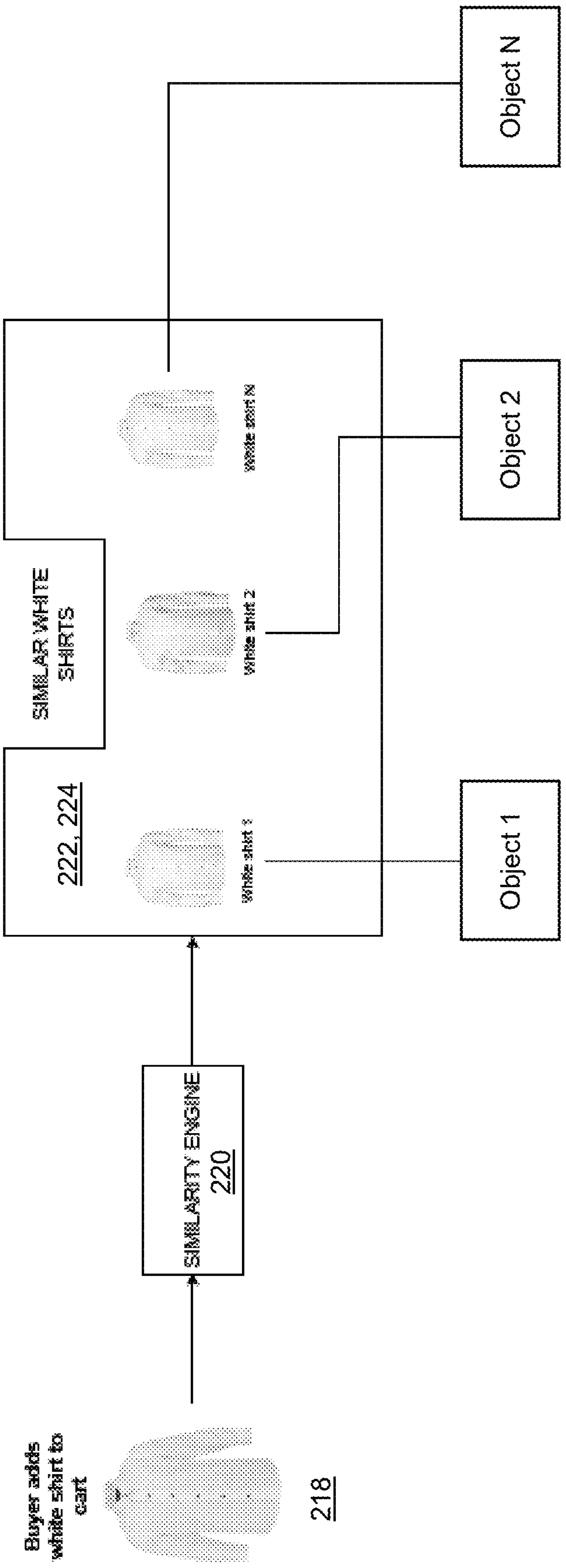
FIGS. 6*a* to 6*c* show an example workflow that clusters complementary products based on features identified in images used to identify the complementary products.
Figure 6B:
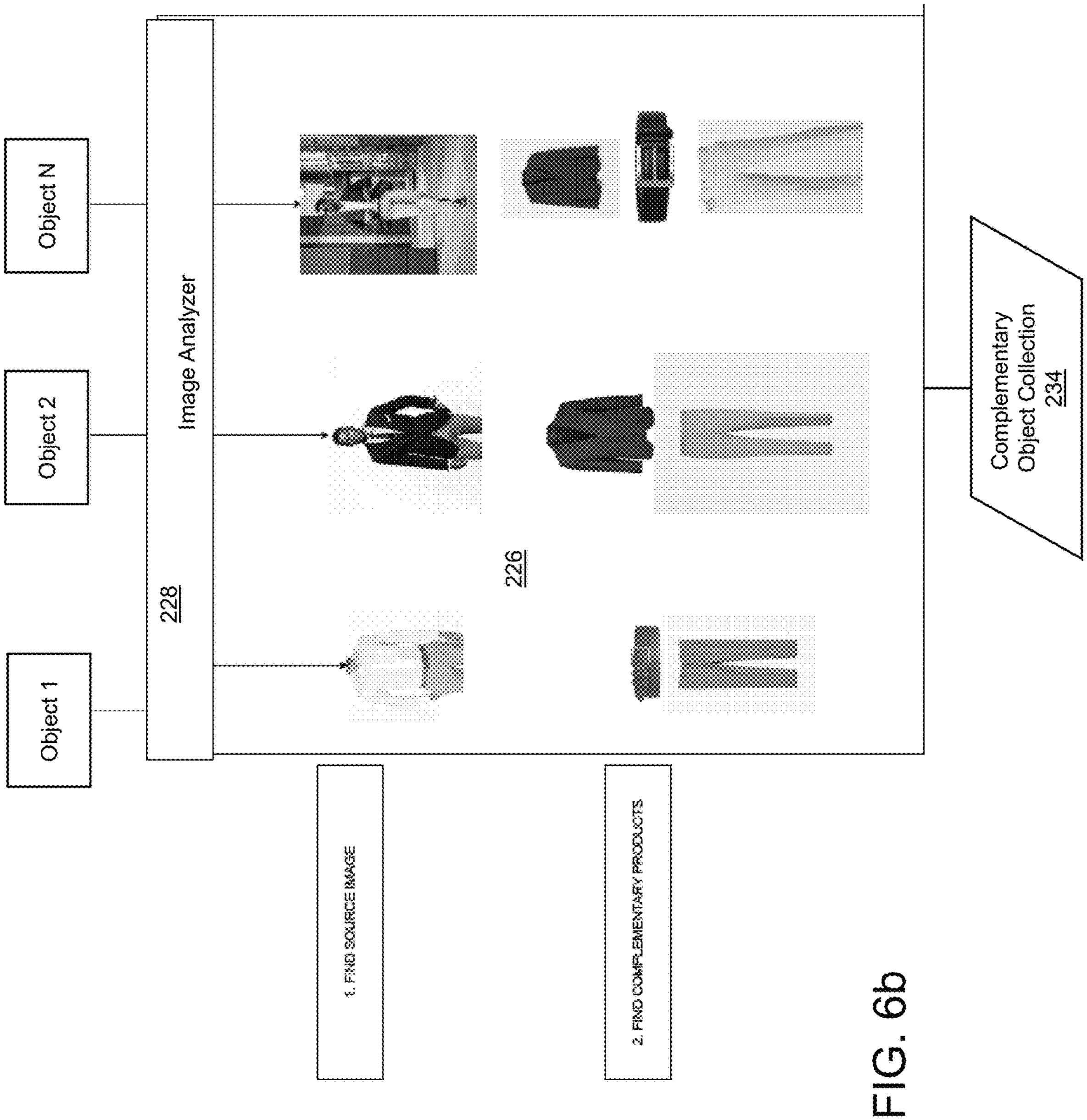
Figure 6C:
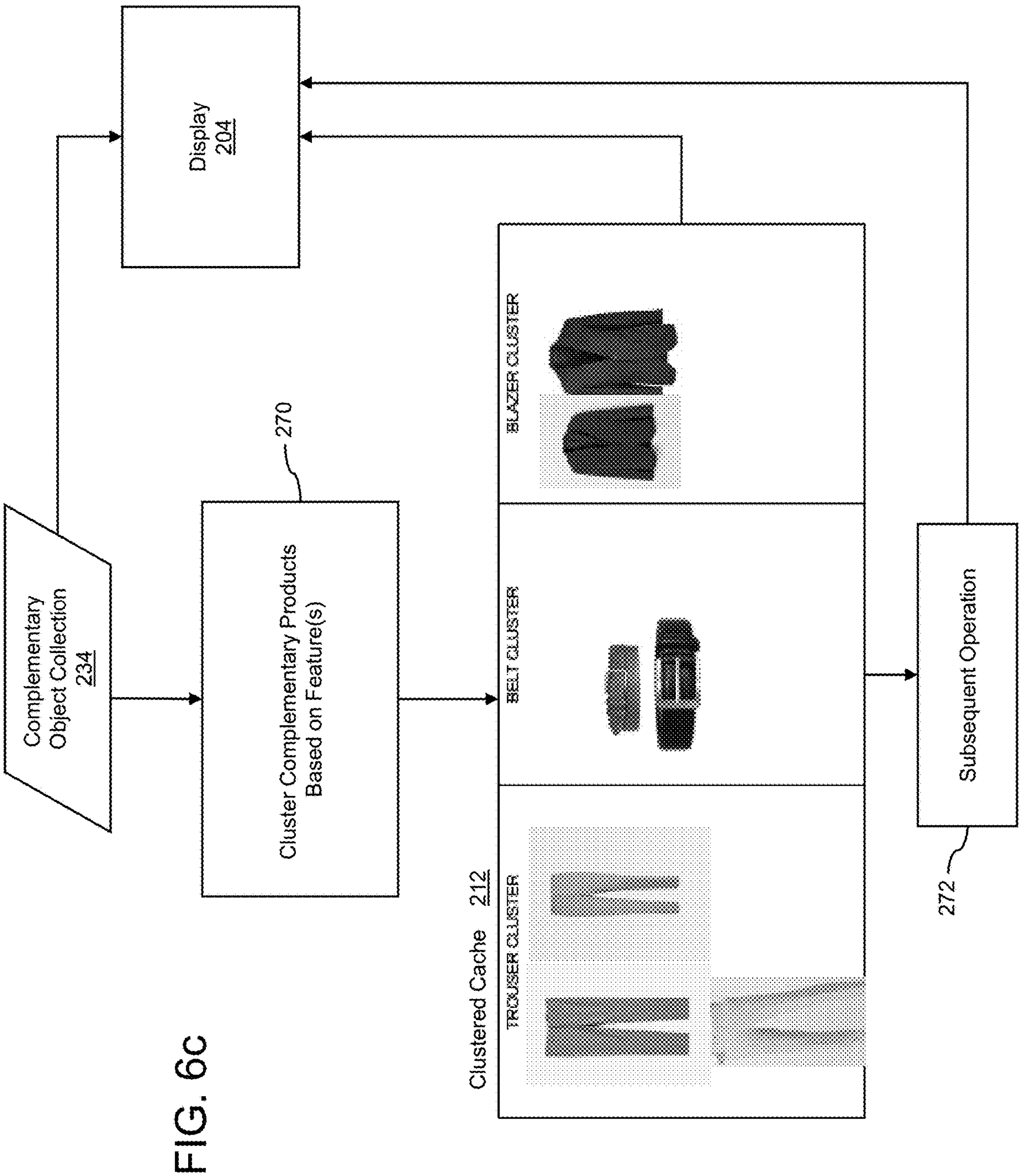

Referring now to FIGS. 6*a*-6*c*, an example of that incorporates the method shown in FIG. 5 and which is provided in the context of purchasing clothing using an e-commerce platform. In this example, a buyer adds a white shirt to their cart. This selection (and its content) is considered an "input object" or input 218. Identifying this input 218 may initiate the process of finding complementary objects (in this example, products). Here, the similarity engine 220 may be used to find similar white shirts, e.g., using the object database 222 and object images 224. For example, the similarity engine 220 may compare the embeddings of the input shirt to embeddings of other shirts in the database 222.

For each similar white shirt (shown as Object 1, Object 2, . . . . Object N in FIGS. 6*a* and 6*b*), the image analyzer 228 may reference one or more associated images 226 to identify additional products that are present in that associated image(s) 226. As noted above, each similar white shirt may itself be associated with more than one image 226 having other products, e.g., complementary products. For example, one or more associated images 226 may include the similar white shirt worn with additional products. After determining at least one similar white shirt based on the input white shirt and assembling a collection of images 226 depicting the at least one similar white shirt, a collection of complementary products may be determined based on the associated images 226. Tags such as product IDs can be determined from the image(s) or, as noted above, LLMs 230, LLM-based chatbots or image processing techniques (or a combination of one or more of these techniques) may be used to determine the objects from the images 226.

For example, an object detection model may be trained to identify apparel in an image. The output of the model may include a bounding box and label for each identified item of clothing. The analyses can be conducted by using a rule set, taxonomy or list of questions (e.g., to query a LLM 230) that is associated with the white shirt. For example, by identifying the input object as a white shirt, a clothing taxonomy can be used to determine which objects may be complementary in any given associated image 226. In this way, irrelevant objects can be ignored. For example, an associated image 226 of a human wearing a white shirt and complementary clothing may be relevant, while background objects such as a bench, building, landscaping, vehicles, etc., may not. That is, the associated images 226 may be processed using a candidate list of complementary objects, which then permits an analysis technique to generate a refined list of complementary products. This permits a more personalized collection to be created by not only finding objects in the same image, but finding objects that are more likely to be complementary and thus more relevant to the user.

Figure 7:
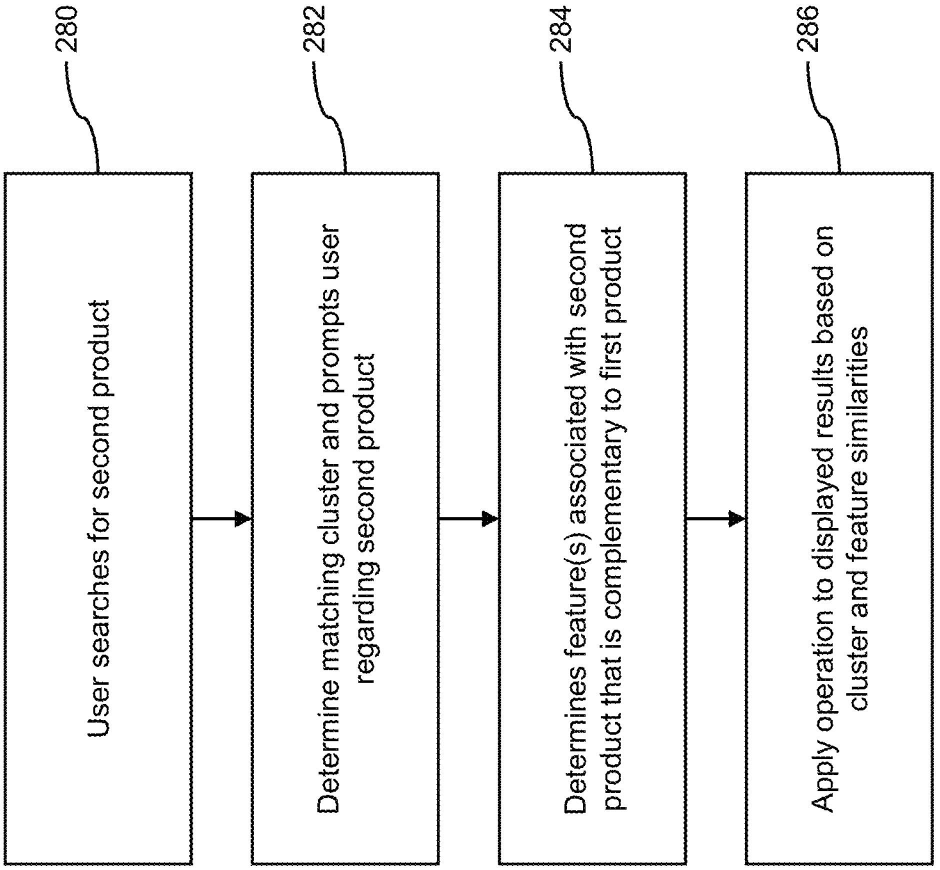
FIG. 7 is a flow chart illustrating example operations for implementing one or more subsequent operations using a cache of clustered complementary products.

The output collection of complementary products (i.e., the complementary object collection 234) may then be used in a subsequent step in a design, purchase or other workflow as shown in FIGS. 6*c* and 7. This may include providing the output collection 234 as the output or using the output collection 234 in a subsequent operation.

As indicated above, to organize the output collection 234, particularly with a relatively large number of results, clustering can be performed at block 270 as described below making reference to FIG. 6*c*. The clustered products may be used to pre-emptively provide related products that are more likely to be complementary, may be used to initiate a query such as asking the user if they are also interested in trousers or a belt, or may be used to refine subsequent search queries or sessions more generally. That is, the output collection 234 (and/or the clustered output collection) may be stored or otherwise cached for later use (e.g., in a clustered cache 212). The cache 212 may be populated with a particular collection 234 for a certain period of time. For example, the cache 212 may hold a collection 234 based on a time metric or a distance metric such as how far a subsequent search is within a product taxonomy. That is, if a user 208 begins searching for completely unrelated products, a currently held collection 234 may be discarded and a session related to that collection 234 has ended.

While the collection 234 is held in the cache 212, a subsequent option 272 may utilize the collection 234. For example, referring back to the white shirt example, the buyer, after adding the white shirt to the cart, may search for grey pants. By having used the associated images 226 as a proxy to find potential complementary products, a trouser cluster (or grey pant sub-cluster) may be referenced to prompt the buyer with a targeted and personalized question, such as "Are you looking for pants to match your white shirt?". Other features may be identified to provide additional queries such as a color or style or any other attribute of the product.

Referring now to FIG. 7, a flow chart is provided illustrating example operations for using a clustered collection 234 in a subsequent operation 272. At block 280, the application 202 determines that the user 208 searches for a second product, with the first product being the one that initiated and led to the creation of the cached complementary object collection 234.

At block 282, the application 202 (or complementary object engine 300) may determine a matching cluster and prompt the user 208 regarding the second product. For example, if the buyer searches for "grey pants", the application 202 may use the cache 212 to identify a matching cluster for grey pants and may prompt the buyer with the question indicated above, namely: "Are you looking for pants to match your white shirt?". The user may reply to this prompt by indicating "yes", which may have the application 202 (or complementary object engine 300) at block 284 determine one or more features associated with the second product (i.e., the grey pants in this example) that is/are complementary to the first product (i.e., the white shirt in this example). The feature(s) may be used at block 286 to apply an operation to displayed results based on the cluster and feature similarities. For example, using the matched grey pants cluster confirmed by the user and, optionally, using feature(s) associated with the grey pants that is/are complementary to the white shirt (e.g., dress pants versus track pants, high waisted versus low waisted, etc.), a search result list for "grey pants" can be reranked based on their similarity to the matching cluster and the common feature(s).

The prompts and questions illustrated above may be refined or controlled based on certain conditions. For example, a cluster may need to meet a certain size threshold to be considered complementary. Similarly, the type of clusters, number of clusters, and cluster sizes may be used to intelligently reorder search results in addition to, or instead of, posing questions to the user. For example, in the above example, by searching for "grey pants", the search results may be reordered to push the complementary grey pants (or other complementary pants of another color) to the top of the search results. This process may be repeated for multiple subsequent searches. For example, a search for "brown shoes" may utilize the output collection 234 (clustered or not) or may refine the collection 234 based on the addition of particular grey pants that resulted from the above search. That is, the output collection of complementary objects and any clustering or organization of such a collection can be refined or replaced with a fresh output collection 234 as a session progresses and further objects may be selected and identified as new input objects. Similarly, sessions that include disparate searches for products added to the same cart may involve repeating the process and generating multiple output collections 234 that are based on different candidate lists of objects.

Figure 8A:
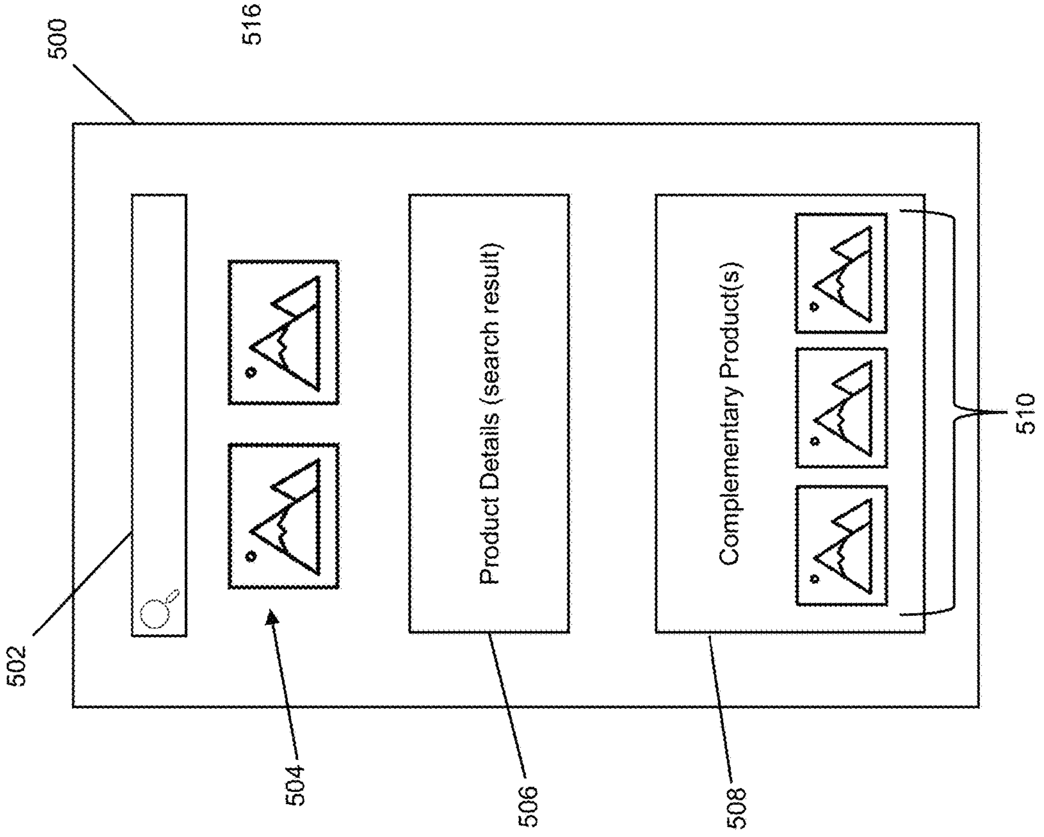
FIG. 8*a* shows an example of a user interface for conducting a product search.

Referring now to FIG. 8*a*, an application UI 500 is shown, e.g., for application 202 that includes a search function 210. In this example, the UI 500 enables a user 208 to search for products, e.g., in a product catalogue or e-commerce site. The search function 210 is utilized by entering text into a search bar 502 and returns a set of images 504 and product details 506 for the search result. For example, the UI 500 illustrated in FIG. 8*a* may display images 504 and product details 506 for a white shirt per the example in FIGS. 6*a*-6*c*. In this example, a complementary products portion 508 is included, which includes an image 510 for each complementary product. It can be appreciated that other data may be displayed in the complementary products portion 508, e.g., product names, descriptions, links to further content, etc.

Figure 8B:
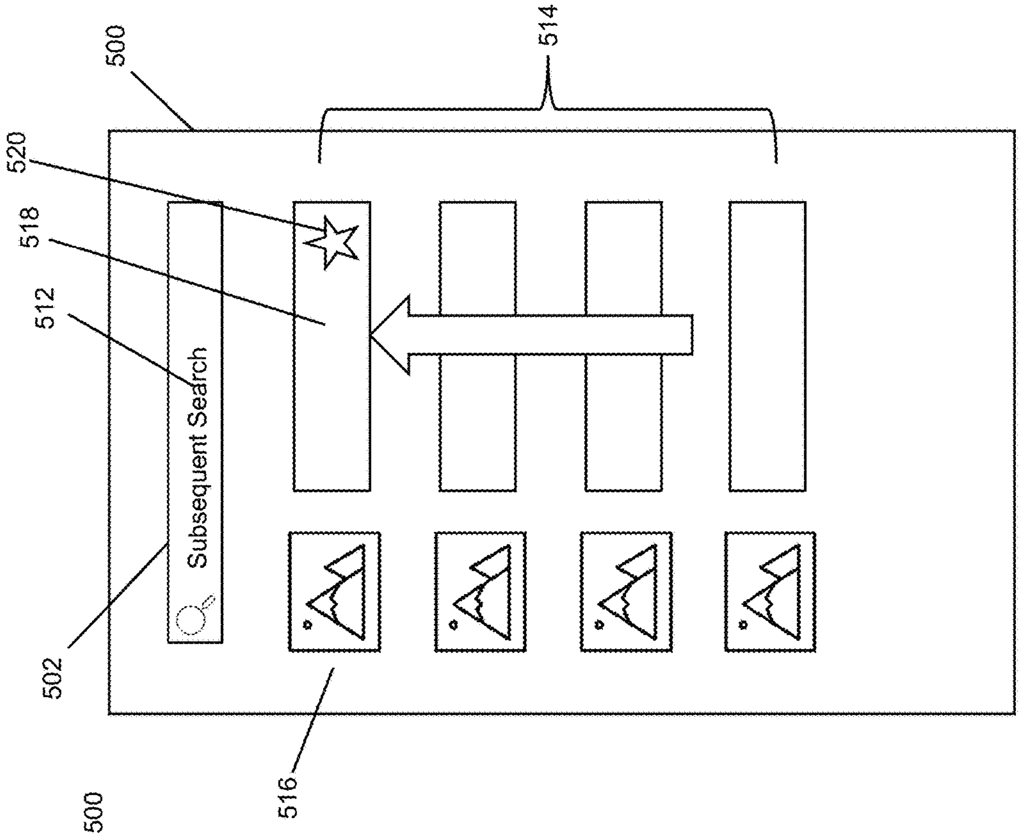
FIG. 8*b* shows an example of a user interface for displaying a search result list.

FIG. 8*b* illustrates a list 514 of search results for a subsequent search entered in the search bar 502. It may be noted that the details for the initial search (shown in FIG. 8*a*) may have been selected from a search result list 514 such as that shown in FIG. 8*b*. In FIG. 8*b*, the list 514 includes a number of results, each including an image 516 and a title or short description 518. In this example, an identifier 520 may be used to designate a complementary object, however, no such identifier 520 would be required. The search result list 514 in this example is shown as being reordered, for example, by surfacing the identified entry (including the identifier 520 here for illustrative purposes) to the top of the list 514. That is, the UI 500 may be altered or otherwise controlled by the application 202 using the cached complementary object collection 234 that is determined based on the input(s) 218 associated with an initial interaction with the application 202 as shown in FIG. 8*a*.

Figure 8C:
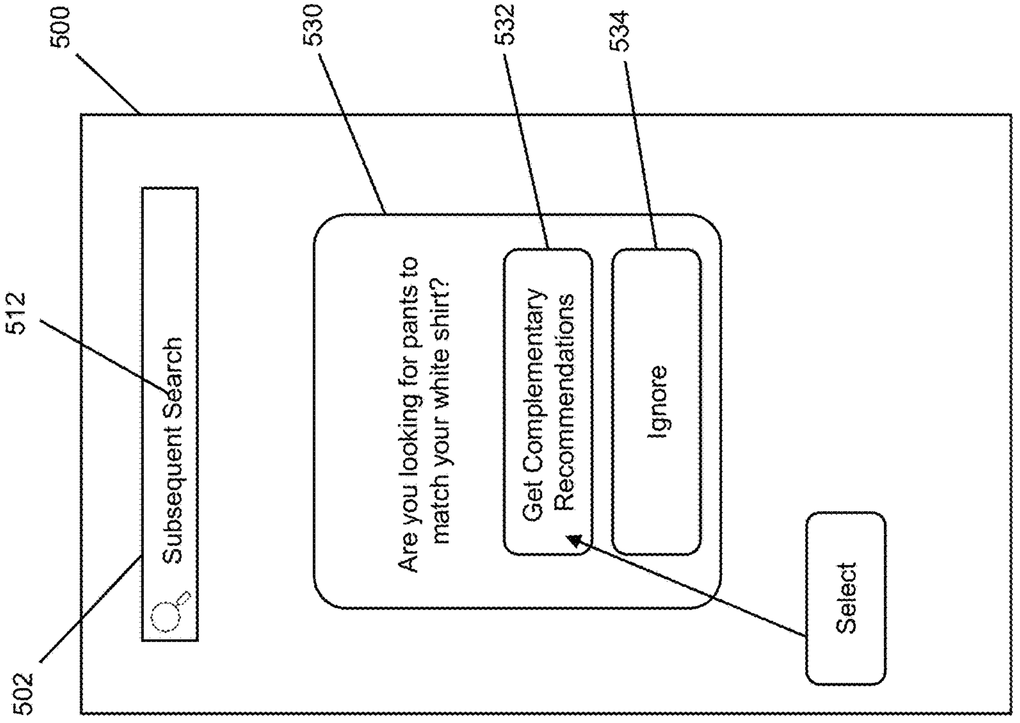
FIG. 8*c* shows an example of a user interface for providing a complementary product recommendation.
Figure 8D:
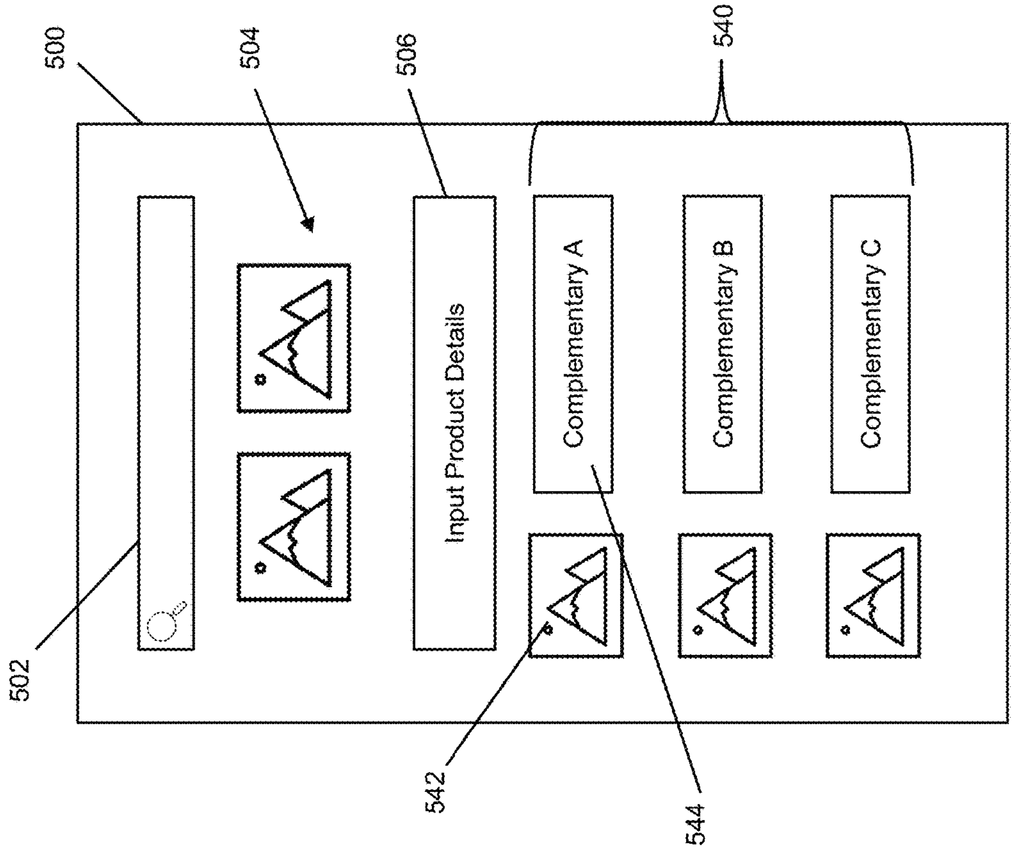
FIG. 8*d* shows an example of a user interface for displaying a complementary product list.

Referring to FIG. 8*c*, additionally or alternatively to altering a search result list 514, the application 202 may prompt the user 208 regarding the subsequent search. For example, in response to text entered into the search bar 502 or pre-emptively after the complementary object process described herein has been executed, the application 202 may display a prompt 530 in the UI 500 that queries whether the user is looking for pants to match the white shirt (using the above example). As noted, this prompt 530 can be proactive or reactive to further interactions with the UI 500. The prompt 530 in this example includes a get option 532 to have the application 202 use the cached collection 234 or have the complementary object engine 300 generate a set of recommendations based on the search for the white shirt, namely the initial input(s) 218. Selecting the get option 532 as shown in FIG. 8*c* may launch a complementary objects list 540 as shown in FIG. 8*d*. The prompt 530 in this example also include an ignore option 534, which enables the user 208 to bypass the recommendation, e.g., to have the search results list 514 provided as shown in FIG. 8*b*.

Referring now to FIG. 8*d*, the complementary objects list 540 may include an image 542 and product title or short description 544. In this example, the complementary objects list 540 is displayed along with product details related to the original input 218, by displaying the images 504 and product details 506. As such, the UI 500 as shown in FIG. 8*d* may be considered an alternative to the complementary products portion 508 shown in FIG. 8*a*. As such, it can be seen that various subsequent operations 272 (see FIG. 6*c*) may utilize the complementary object collection 234 or a clustered/organized version thereof.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 9:
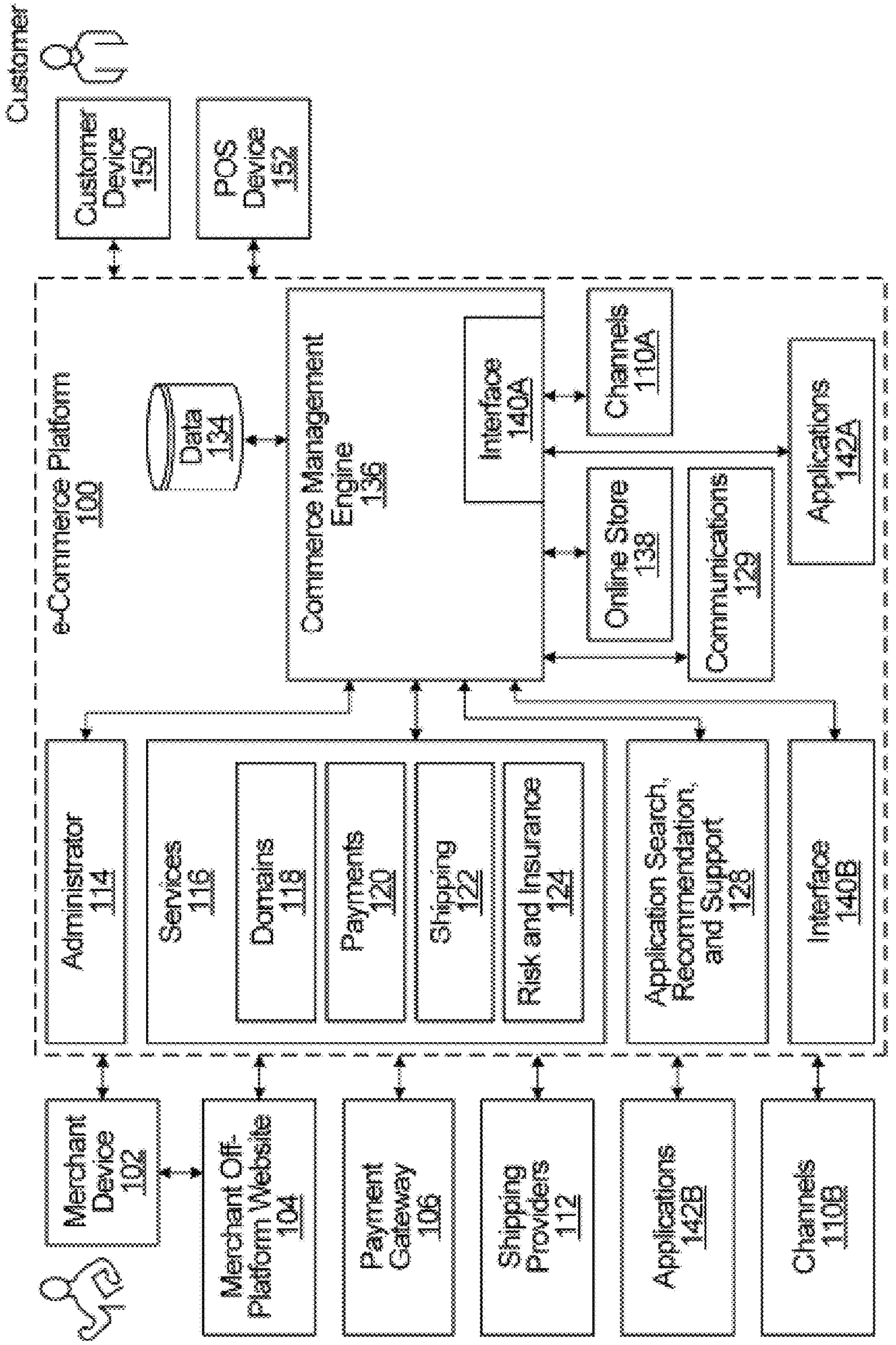
FIG. 9 is a block diagram illustrating an example of a configuration for an e-commerce platform.

FIG. 9 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 9, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 10:
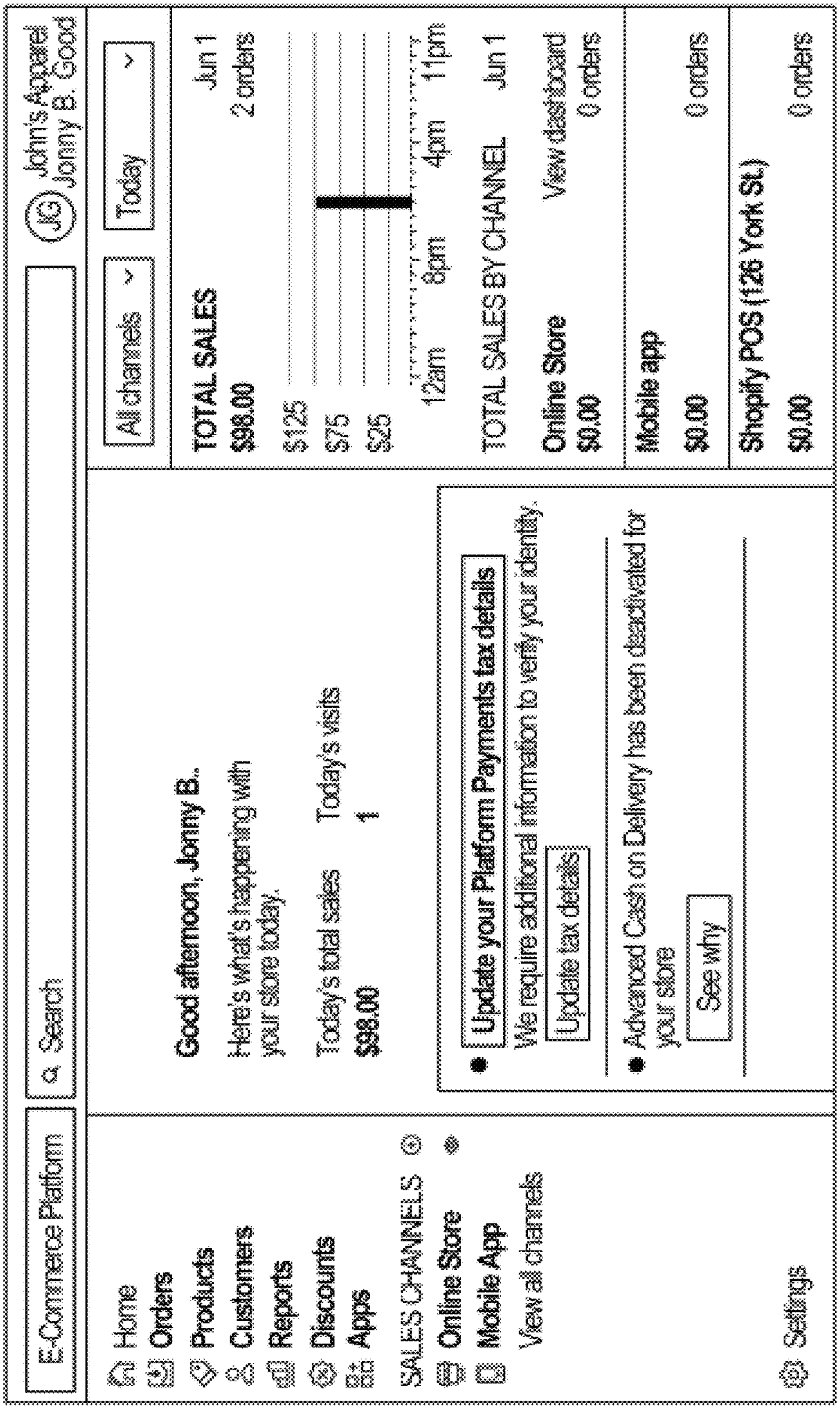
FIG. 10 shows an example of a user interface for interacting with the e-commerce platform shown in FIG. 9.

FIG. 10 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 10. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 9, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to obtain or capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date based ledger that records sale-related events that happened to an item).

Implementation in an e-Commerce Platform

Figure 11:
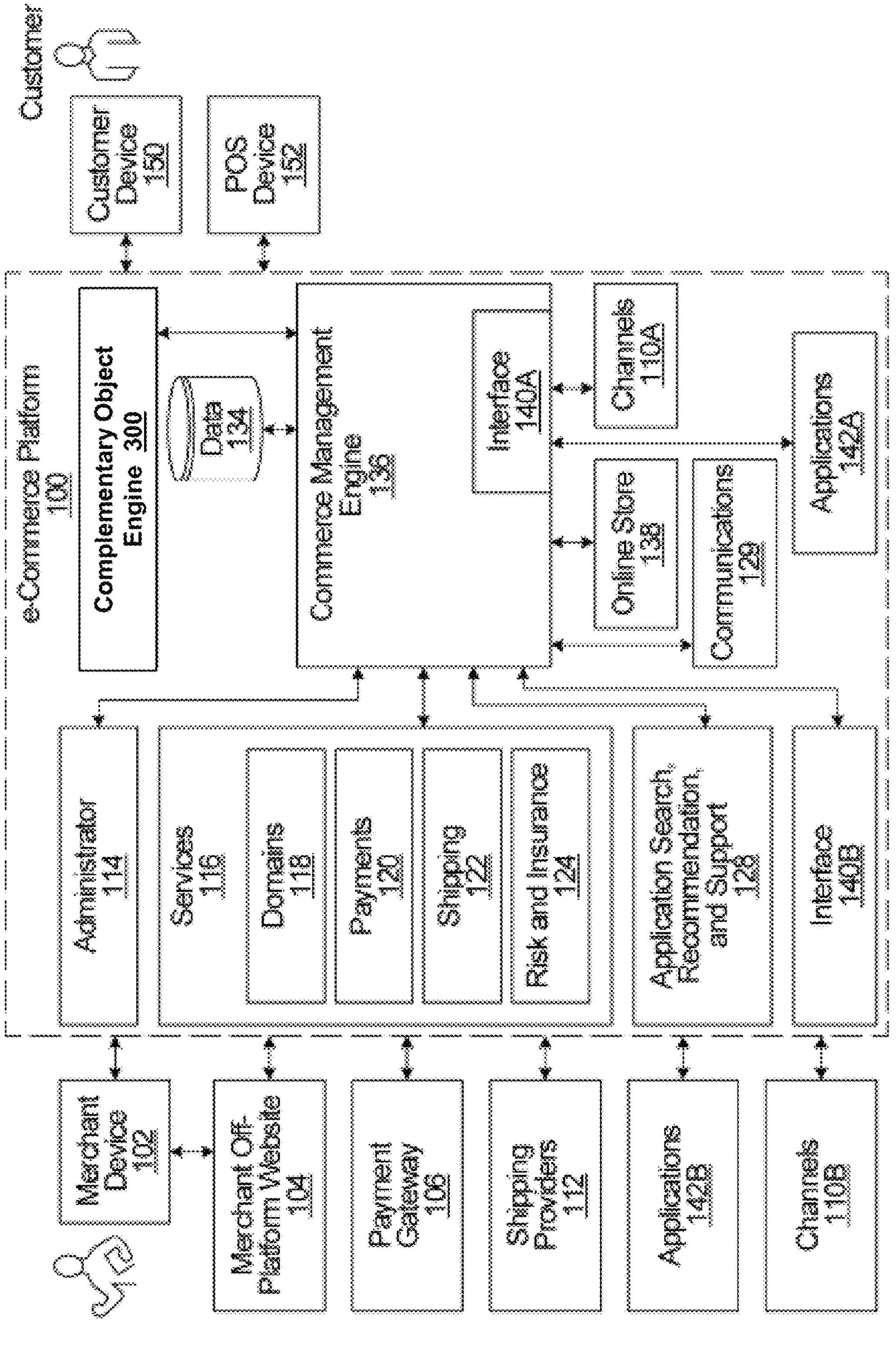
FIG. 11 is a block diagram illustrating an example of the e-commerce platform of FIG. 9 with an integrated administrator user interface engine.

The functionality described herein may be used in commerce to provide improved customer or buyer experiences. The e-commerce platform 100 could implement the functionality for any of a variety of different applications, examples of which are described elsewhere herein. FIG. 11 illustrates the e-commerce platform 100 of FIG. 9 but including the complementary object engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 11, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the service provider application 28 and administrator UI controller 12 are implemented as an engine 300, coupled to the commerce management engine 136 and/or interface 140B to enable the administrator UI functionality to be integrated into an administrator UI 70 displayed by the administrator UI controller 12 to the merchant device 102, the customer device 150, or both.

The engine 300 could implement at least some of the functionality described herein, for example based on the examples shown in FIGS. 8*a* through 8*d*. Although the embodiments described below may be implemented in association with an e-commerce platform, such as (but not limited to) the e-commerce platform 100, the embodiments described below are not limited to e-commerce platforms.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 200, computing device 240, computing system 400, e-commerce platform 100, or engine 300, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:

determining an object in a first image;

searching for one or more similar objects based on a similarity of those objects to the object in the first image, using an input embedding associated with the first image, and object embeddings associated with the one or more objects;

obtaining a plurality of images containing the one or more similar objects;

identifying, using the images containing the one or more similar objects, complementary objects to the one or more similar objects; and providing an output collection of identified complementary objects.

2. The method of claim 1, further comprising:

clustering the output collection of identified complementary objects into object clusters based on similarities between the complementary objects.

3. The method of claim 2, further comprising:

using the object clusters to provide at least one recommended object associated with the first image.

4. The method of claim 3, wherein the object clusters are used if satisfying a size threshold.

5. The method of claim 3, wherein the at least one recommended object is provided in response to an input related to another object that is associated with at least one of the object clusters.

6. The method of claim 5, wherein the another object is identified from a search query associated with the another object.

7. The method of claim 5, further comprising:

providing the at least one recommended object if a distance metric is satisfied.

8. The method of claim 7, wherein the distance metric comprises a time since identifying the input or a distance between the input and the another object in a taxonomy of objects.

9. The method of claim 2, further comprising:

displaying a query comprising a characteristic of one of the object clusters; and displaying a reordered result list of objects based on a response to the query.

10. The method of claim 1, wherein identifying the complementary objects using the images comprises instructing a large language model (LLM) to analyze the images for presence of at least one of the complementary objects.

11. The method of claim 10, wherein the LLM comprises an artificial intelligence chatbot.

12. The method of claim 1, wherein identifying the complementary objects using the images comprises applying an image processing technique to the images to detect objects in the images and identify detected objects using a machine learning model trained to detect objects in images.

13. The method of claim 1, wherein identifying the complementary objects using the images comprises using metadata accompanying a corresponding one of the images, the metadata comprising at least one similarity to one of the complementary objects.

14. The method of claim 1, wherein at least one of the objects comprises a plurality of associated images used to identify the complementary objects.

15. The method of claim 1, wherein the object in the first image is determined from a search query related to the object-associated with the input.

16. The method of claim 1, wherein the first image is determined from a selection of the object.

17. The method of claim 16, wherein the first image is selected from a search query related to the object.

18. The method of claim 1, wherein the object in the first image and the output collection of identified complementary objects correspond to products viewable via an e-commerce platform.

19. The method of claim 18, wherein associated images comprising the complementary objects are accessed from a database available to the e-commerce platform.

20. The method of claim 1, wherein a candidate list of complementary objects is used to identify the complementary objects using the images.

21. The method of claim 20, wherein the candidate list of complementary objects is selected from one of a plurality of candidate lists based on an object type.

22. A system comprising:

a processor;

an output device coupled to the processor;

at least one input device coupled to the processor; and at least one memory, the at least one memory comprising processor executable instructions that, when executed by the at least one processor, causes the system to:

determine an object in a first image;

search for one or more similar objects based on a similarity of those objects to the object in the first image, using an input embedding associated with the first image, and object embeddings associated with the one or more objects;

obtain a plurality of images containing the one or more similar objects;

identify, using the images containing the one or more similar objects, complementary objects to the one or more similar objects; and provide an output collection of identified complementary objects.

23. A computer-readable medium comprising processor executable instructions that, when executed by a processor, cause the processor to:

determine an object in a first image;

search for one or more similar objects based on a similarity of those objects to the object in the first image, using an input embedding associated with the first image, and object embeddings associated with the one or more objects;

obtain a plurality of images containing the one or more similar objects;

identify, using the images containing the one or more similar objects, complementary objects to the one or more similar objects; and provide an output collection of identified complementary objects.

24. The system of claim 22, further comprising processor executable instructions that, when executed by the at least one processor, cause the system to:

cluster the output collection of identified complementary objects into object clusters based on similarities between the complementary objects.

* * * * *